(12) United States Patent
Lejeune et al.

(10) Patent No.: US 7,791,799 B1
(45) Date of Patent: Sep. 7, 2010

(54) HEMISPHERICAL PROJECTION

(75) Inventors: Chris Lejeune, San Francisco, CA (US);
Travis Threlkel, San Francisco, CA (US)

(73) Assignee: Obscura Digital, San Francisco, CA (US)

( * ) Notice: Subject to any disclaimer, the term of this patent is extended or adjusted under 35 U.S.C. 154(b) by 242 days.

(21) Appl. No.: 12/050,026

(22) Filed: Mar. 17, 2008

(51) Int. Cl.
G03B 21/56 (2006.01)

(52) U.S. Cl. ....................... 359/443; 359/451

(58) Field of Classification Search ........... 359/443, 359/451, 461
See application file for complete search history.

(56) References Cited

U.S. PATENT DOCUMENTS

| | | | |
|---|---|---|---|
| 4,022,522 A * | 5/1977 | Rain | 359/443 |
| 4,339,175 A * | 7/1982 | Astero | 359/451 |
| 4,478,902 A * | 10/1984 | Tsuzuku et al. | 428/174 |
| 4,642,945 A * | 2/1987 | Browning et al. | 52/10 |
| 4,750,808 A * | 6/1988 | Nash et al. | 359/451 |
| 4,802,734 A * | 2/1989 | Walter | 359/443 |
| 6,008,938 A * | 12/1999 | Suehle et al. | 359/443 |
| 6,128,130 A * | 10/2000 | Zobel et al. | 359/443 |
| 6,501,599 B1 * | 12/2002 | Randolph et al. | 359/451 |

FOREIGN PATENT DOCUMENTS

| | | |
|---|---|---|
| JP | 2004-533003 A | 10/2004 |
| JP | 2004-309528 A | 11/2004 |
| JP | 2005-017398 A | 1/2005 |
| JP | 2007-298929 A | 11/2007 |

OTHER PUBLICATIONS

Written Opinion of the International Searching Authority for Related Foreign Application PCT/US2009/36578.
International Search Report for Related Foreign Application PCT/US2009/36578.

* cited by examiner

*Primary Examiner*—Christopher Mahoney
(74) *Attorney, Agent, or Firm*—Stattler-Suh PC

(57) ABSTRACT

A method of projection provides a frame structure that has a base and a top, couples a first membrane layer to the frame structure, and couples a second membrane layer to the first membrane layer, thereby forming a cavity enclosed by the first membrane layer and the second membrane layer. The method removes air from the enclosed cavity such that the second membrane layer is drawn toward the frame structure, and projects an image onto a surface of the second membrane layer. Some embodiments include a system for implementation of the foregoing.

19 Claims, 14 Drawing Sheets

HEMISPHERICAL PROJECTION

FIELD OF THE INVENTION

The present invention is related to the field of projection and is more specifically directed to hemispherical projection.

BACKGROUND

Traditionally, images, movies, slide shows, and the like, are projected along a horizontal plane against a wall or screen. Less common alternatives to horizontal projection include vertical and/or ceiling projection as part of an immersive environment, for instance. Projection onto a ceiling surface includes dome type surfaces. A dome is a structural element of architecture that resembles the hollow upper half of a sphere. Domes do not necessarily have a cross-section of a sphere, and some domes may be formed by using an ellipse. A dome can be formed by taking an arch and rotating the arch around its vertical axis.

Tall domes and low domes are possible. A very low dome is a saucer dome. Another type of dome is an oval dome. A saucer dome is a low pitched shallow dome that has a circular base and a segmental (less than a semicircle) section. A section across the longer axis results in a low dome, capping the volume. Many of the largest existing domes are saucer domes. The onion dome resembles more than half of a sphere and is often found in eastern architecture.

Typically, all the surfaces of a dome are curved. In architectural construction, vaulted spaces are often formed enclosed beneath a concrete dome structure. A small dome can be constructed of ordinary masonry, held together by friction and compressive forces. A dome can sit directly on a circular base, or on another base shape such as a square. The concave triangular or trapezoidal sections of vaulting that provide the transition between a dome and the square base on which it is set are called pendentives, which transfer the weight of the dome to the base. The pendentives, which are triangular segments of a sphere, taper to points at the bottom and spread at the top to establish the continuous circular or elliptical base needed for the dome. In a simple dome, the pendentives are part of the same sphere as the dome itself. Simple domes are rare. In the more common compound dome the pendentives are part of the surface of a sphere of larger radius than the dome itself but whose center is at a point lower than that of the dome. A less sophisticated version of a pendentive is a squinch. Domes have a great deal of structural strength and have several advantages for projection.

SUMMARY

A surface for vertical and/or ceiling projection has particular requirements. Moreover, the location for a desirable surface projection may not already have a suitable structure in place. For instance, though a dome may be a useful structure for performing a vertical and/or ceiling surface projection, the dome or an adequate dome surface may not be readily available. Conventionally, constructing such a suitable structure, even if possible, is time consuming and expensive.

A method of projection provides a frame structure that has a base and a top. The method couples a first membrane layer to the frame structure, and couples a second membrane layer to the first membrane layer, thereby forming a cavity enclosed by the first membrane layer and the second membrane layer. The method removes air from the enclosed cavity such that the second membrane layer is drawn toward the frame structure, and projects an image onto a surface of the second membrane layer.

In some embodiments, the method provides a reverse pressure to remove air from the enclosed chamber. For instance, the reverse pressure is provided by a fan that is positioned at one or more points along the frame structure. Alternatively, or in conjunction with these embodiments, some embodiments provide a forward pressure by using a fan positioned near the base of the frame structure to blow air toward the first and/or second membrane layer.

The first membrane layer is coupled to an exterior and/or an interior surface of the frame structure. When coupled at the exterior, the coupling is at several points near the perimeter of the first membrane layer. When, the first membrane layer is coupled to an interior surface of the frame structure, the coupling is at several points near the perimeter of the first membrane layer and near the top of the frame structure. Some implementations blow air against the first membrane layer by using a fan positioned near the base of the frame structure to facilitate the coupling of the first membrane layer to the interior surface of the frame structure.

The frame structure may be made of a variety of materials selected for strength and/or portability including, for example, steel, aluminum, and/or air filled tubing. The frame structure is also selected for strength, construction, projection, and/or other performance characteristics including, for example, geodesic domes, metal domes, inflatable domes, pyramids, and/or cube type structures. In one embodiment, the second membrane layer does not extend to the base of the frame structure, and the projection originates from a position that is several feet above the base of the frame structure. Some methods further anchor the base of the frame structure to a fixed position such that the first and second membranes are resistant to motion caused by wind.

A projection system includes a frame structure having a base and a top. The projection system also has a first membrane layer coupled to the frame structure, and a second membrane layer coupled to the first membrane layer such that an enclosure is formed between the first membrane layer and the second membrane layer. The projection system further includes an air flow device for removing air from the enclosure formed by the first membrane layer and the second membrane layer.

In some embodiments, the air flow device is a fan for providing a reverse pressure to remove air from the enclosure formed by the first and second membranes. In these embodiments, the fan is positioned at one or more points along the frame structure. Alternatively, or in conjunction with the reverse pressure fan, some embodiments include a forward pressure fan for providing a forward pressure from the base of the frame structure toward the first and/or second membrane.

In one implementation, the first membrane layer is coupled to an exterior surface of the frame structure at several points near a perimeter of the first membrane layer. Alternatively, the first membrane layer is coupled to an interior surface of the frame structure at several points near a perimeter of the first membrane layer and near the top of the frame structure. Further, during assembly, a fan may be used to blow air against the first membrane layer to facilitate the coupling of the first membrane layer to the interior surface of the frame structure. In this case, the fan is positioned near the base of the frame structure. The frame structure is formed by using a one or more materials selected from steel, aluminum, and/or air filled tubing. Accordingly, the frame structure of these embodiments comprises one or more of a geodesic dome, a metal dome, an inflatable dome, a pyramid, and a cube. In a particular implementation, the second membrane layer does not extend to the base of the frame structure, and/or a projector is positioned several feet above the base of the frame structure. Some systems further include an anchor such as, for example, a weight and/or a stake, at the base of the frame structure that is coupled to a fixed position such that the first and second membranes are resistant to motion caused by wind.

Preferably, the first membrane comprises a material that is selected for one or more of weight, strength, stretch, fire resistance, and light blocking properties. For instance, the first membrane of some embodiments is made of vinyl such as found in outdoor tents or polyester of a type used in making fabric architecture, or sails for sailboats. In some embodiments, the first membrane layer has a weight of approximately 12-24 ounces per square yard. In a particular embodiment, the first membrane comprises black or a dark colored 500 Denier Polyester.

Also preferably, the second membrane has a projection surface that is selected for one or more of weight, strength, stretch, fire resistance, distortion, and optical quality. In some cases, the second membrane is made of a light weight polyester or a rip stop nylon of a type used in fabric architecture, tents, and/or parachutes. In some embodiments, the second membrane layer is lighter than the first membrane layer. For instance, the second membrane layer may have a weight of about 5-12 ounces per square yard. In a particular embodiment, the second membrane comprises a grey 200 Denier Polyester.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Figure 1:
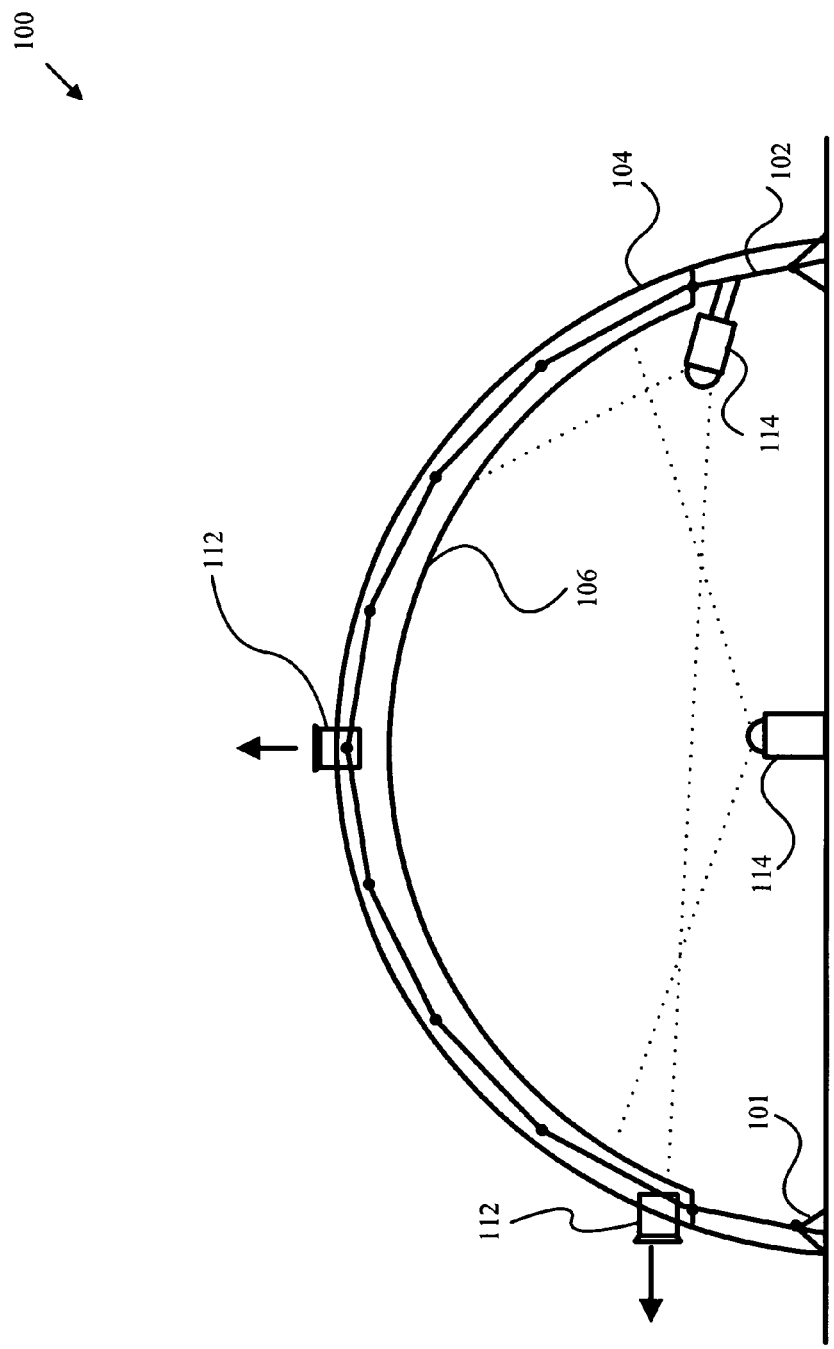
FIG. 1 illustrates a portable projection system.

FIG. 1 illustrates a portable projection system 100. As shown in this figure, the system includes a frame structure 102, a first membrane 104, and a second membrane 106. The frame structure 102 preferably comprises a strong material that may be further selected for cost and weight, as well as strength. The strength of the material affects the maximum size of the structure 102, while the weight may affect portability. Some embodiments use a steel or aluminum for the frame 102 as a balance between cost, weight, and strength. Alternatively, fluid pressurized collapsible tubes are used for the frame 102 of some embodiments. Some systems further include an anchor 101 such as, for example, a weight and/or a stake, at the base of the frame structure 102 that is coupled to a fixed position such that the first and second membranes 104 and 106 are resistant to motion caused by wind.

The first membrane 104 is attached to the frame structure 102 by using a removable means such as, for example, straps secured by using Velcro, snaps, and/or zippers. In one implementation, the first membrane 104 is attached to the exterior of the frame structure 102. In this implementation, the first membrane 104 lies against the frame structure 102 and requires relatively few securing points such as at intervals near a perimeter of the first membrane 104. Such an implementation is further described in relation to FIGS. 3-5. Alternatively, the first membrane 104 is attached to the interior of the frame structure 102, which requires several attachment points near the top of the frame structure 102. In some cases, the first membrane 104 is suspended eight to twelve inches from the frame structure 102. These implementations are further described in relation to FIGS. 6-10.

Preferably, the first membrane 104 comprises a material that is selected for one or more of weight, strength, stretch, fire resistance, and light blocking properties. For instance, the first membrane of some embodiments is made of vinyl such as found in outdoor tents, or nylon and/or polyester of a type used in making fabric architecture, or sails for sailboats. In some embodiments, the first membrane layer has a weight of approximately 12-24 ounces per square yard. In a particular embodiment, the first membrane comprises black or a dark colored 500 Denier Polyester.

The second membrane layer 106 is attached to the first membrane layer 104 in various configurations. In the illustration, the second membrane layer 106 is coupled near a perimeter and/or circumference of the first membrane layer 104. The second membrane 106 is selectively positioned, however, in alternative configurations with respect to the first membrane 104. For instance, the second membrane layer 106 may have a smaller diameter than the first membrane layer 104, and/or be positioned in a non concentric and/or offset position with respect to the first membrane layer 104.

In a particular implementation, the second membrane 106 does not extend to the base of the frame structure 102, and/or a projector is positioned several feet above the base of the frame structure 102. Also preferably, the second membrane 106 has a projection surface that is selected for one or more of weight, strength, stretch, fire resistance, distortion, and optical quality. In some cases, the second membrane is made of a light weight vinyl, or polyester and/or a rip stop nylon of a type used in light weight fabric architecture, tents, and/or parachutes. In some embodiments, the second membrane layer is lighter than the first membrane layer and has a weight of about 5-12 ounces per square yard. In a particular embodiment, the second membrane comprises a grey 200 Denier Polyester.

The system 100 also includes one or more fans or blowers 112 for drawing air out from between the first membrane layer 104 and the second membrane layer 106, and thereby generating a reverse pressure between the layers. As shown in the figure, the fan(s) 112 may be placed at multiple locations along the frame structure 102, however, vertical air draw may be preferable for maximizing the lift provided to the second membrane layer 106 and for preventing the first and second membranes from being drawn close together near the fan(s) 112 and undesirably restricting the air flow of the fan(s) 112. Still, side fan placement has advantages such as easier mounting and access of the fan 112. Hence, when the fan 112 is mounted in a location other than the apex or top of the frame structure 102, then an air duct preferably connects the fan to a location near the top of the frame structure 102 to maximize vertical air flow and minimize the amount of air flow constriction.

The system 100 further includes one or more projectors 114 for projecting an image onto the projection surface of the second membrane layer 106. The projectors 114 are selectively placed at various locations within the frame structure 102. For instance, a projector 114 is placed near the center of the frame structure 102, or alternatively, near the side(s) of the frame structure 102, for projection onto one or multiple regions of the projection surface. Some embodiments further place the projector(s) 114 above ground level thereby reducing undesirable interactions with the audience of the projector(s) 114. One of ordinary skill recognizes that projection includes a multitude of sound, light, audio, and/or visual displays, shows, and/or projections.

Figure 2:
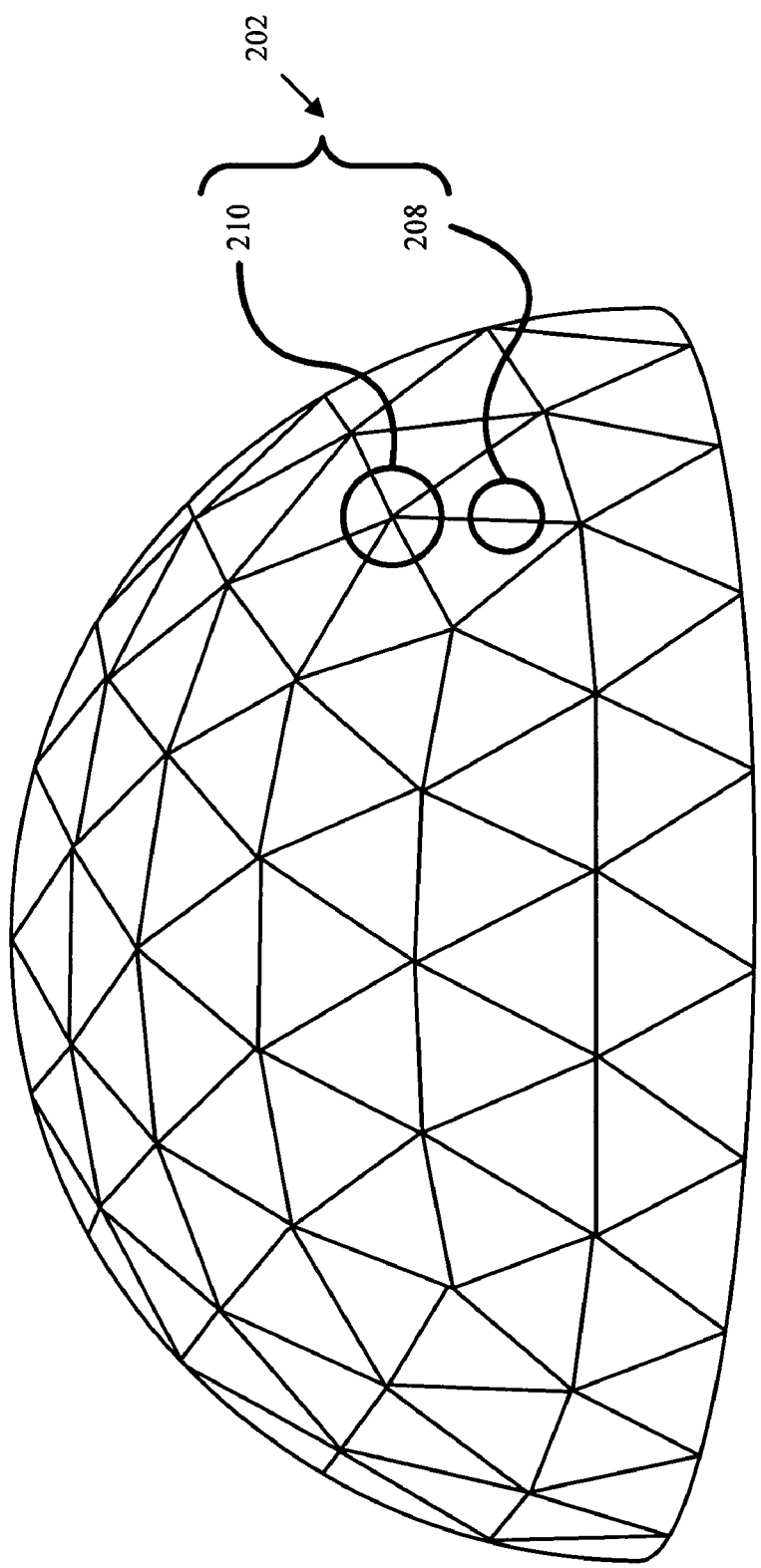
FIG. 2 illustrates a frame structure that has been assembled.

FIG. 2 illustrates a frame structure 202 that has been assembled. As shown in this figure, the particular frame structure 202 is a geodesic type dome structure. The illustrated structure 202 is advantageously comprised of several individual beams 208 and hubs 210 that allow the structure 202 to be disassembled and transported. A hub 210 provides a coupling intersection for several beams 208 such as six beams 208, for example. Some embodiments have a frame structure 202 with a diameter of 10 to 30 or 40 meters, however, larger frame sizes are contemplated depending upon the type of material used for the frame structure 202. The weight and strength of a particular material may present limitations as to the maximum size and/or portability of the frame structure. As mentioned above, suitable materials for the frame structure 202 include metals such as steel or aluminum, and other materials including fluid/air filled tubes.

Figure 3:
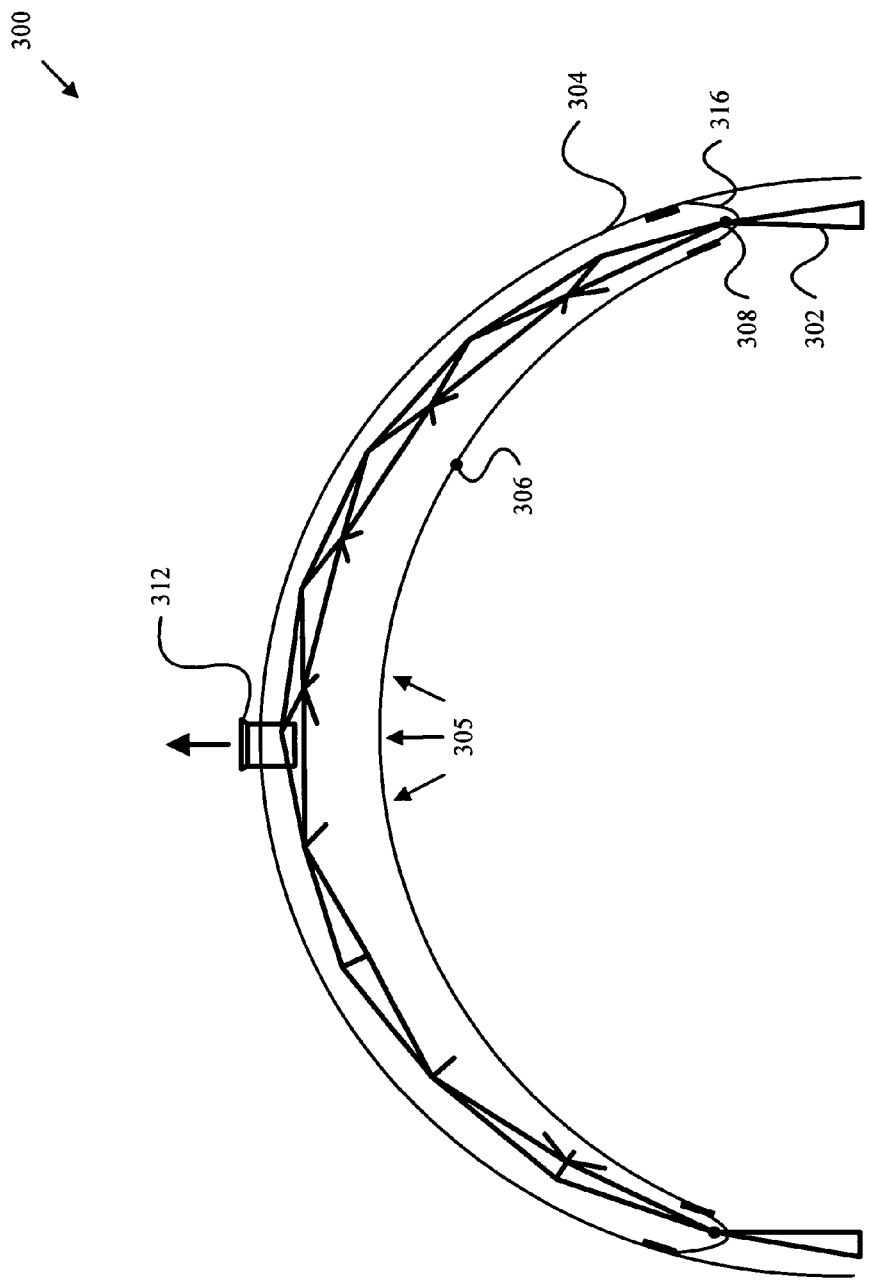
FIG. 3 illustrates a first membrane attached at various points around the exterior of the frame structure.

FIG. 3 illustrates a projection system 300 having a first membrane layer 304 that is attached at various points around the exterior of a frame structure 302. As shown in this figure, the system 300 includes one or more fans or blowers 312, and an internal second membrane layer 306 having a projection surface. In this configuration, the frame structure 302 is hidden from view from the interior and the exterior of the frame structure 302. The first membrane layer 304 lies against the exterior of the frame structure 302 and requires relatively few attachment points. For instance, one implementation uses a series of flaps 316 that are attached near the lower perimeter of the first membrane layer 304, and wrap around a row of beams 308 between the hubs near the base of the frame structure 302. Such an implementation is further described in relation to FIG. 5. The inner second membrane layer 306 is coupled to the first membrane layer 304 by using Velcro, zippers, sewing, and/or by another air sealing means. The seal need not be perfectly air tight, as the continuous operation of the fan 312 tends to maintain negative air pressure and an upward force upon the second membrane layer 306, however, a better air seal improves efficiency and reduces the effort required by the fan 312 to generate the negative pressure. The inner second membrane layer 306 is drawn toward the frame structure 302 by the reverse air pressure generated between the first and second membrane layers 304 and 306, and hence is held in place near its apex mostly by air pressure forces. In some embodiments, this advantageously yields a smooth projection surface 305 for the second membrane layer 306. Moreover, the relative time for forming the smooth projection surface is lower than conventional methods known in the art.

Figure 4:
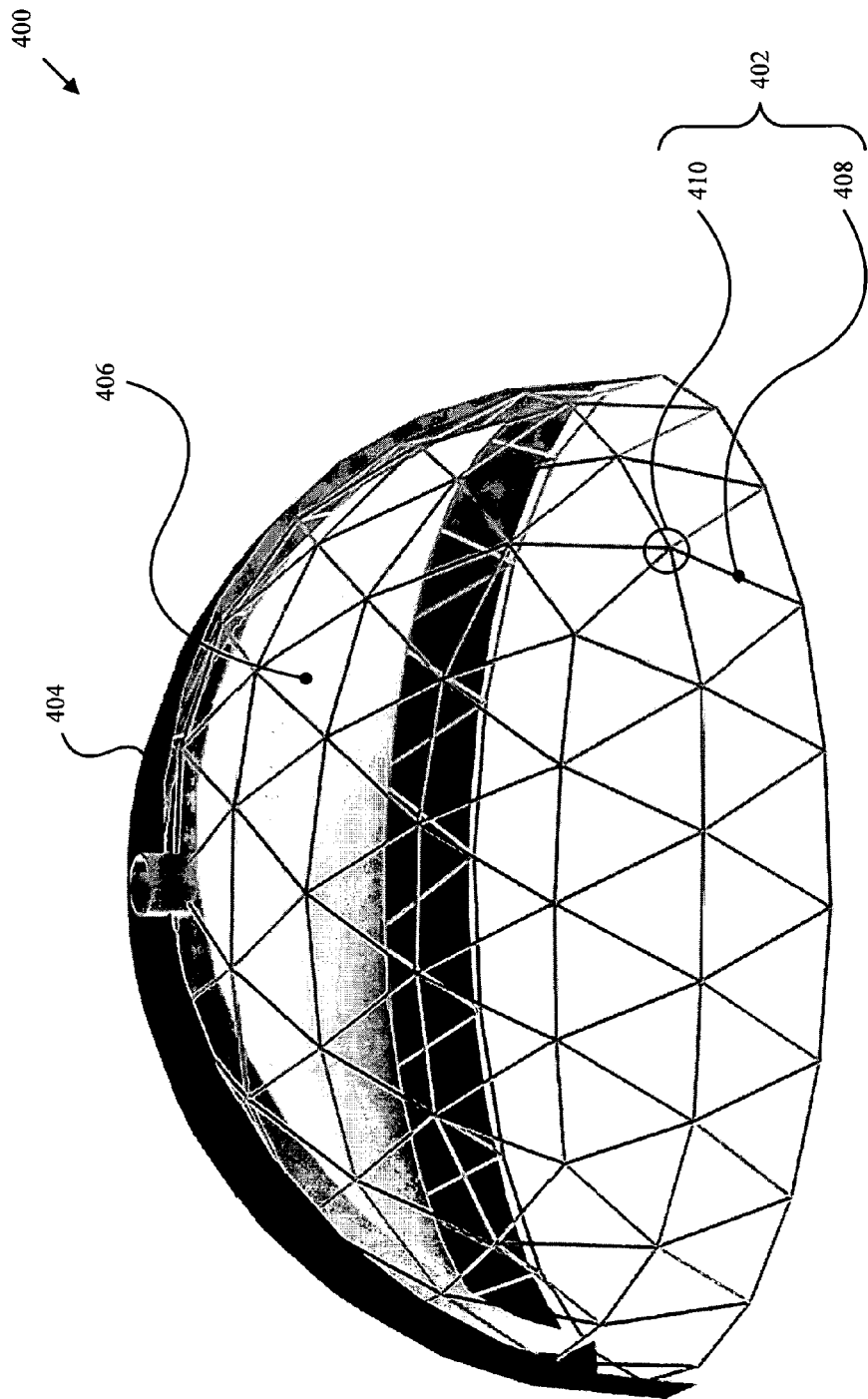
FIG. 4 illustrates a dimensional view of the system of FIG. 3.

FIG. 4 illustrates a dimensional view 400 of the system 300 of FIG. 3. As shown in FIG. 4, the system 400 includes a first membrane layer 404 coupled to the exterior of the frame 402, and a second membrane layer 406 coupled to the interior of the frame 402. The second membrane layer 406 includes a projection surface facing the floor inside the frame structure 402. The frame 402 in this case is a geodesic dome type frame having several beams 408 and hubs 410. Some embodiments use the second row of beams 408 from the bottom of the structure 402 for securing the first membrane layer 404 to the structure 402. The securing means includes a number of secure and releasable means such as, for example, Velcro, zippers, snaps, and/or another means. The securing means of a particular embodiment is described next.

Figure 5:
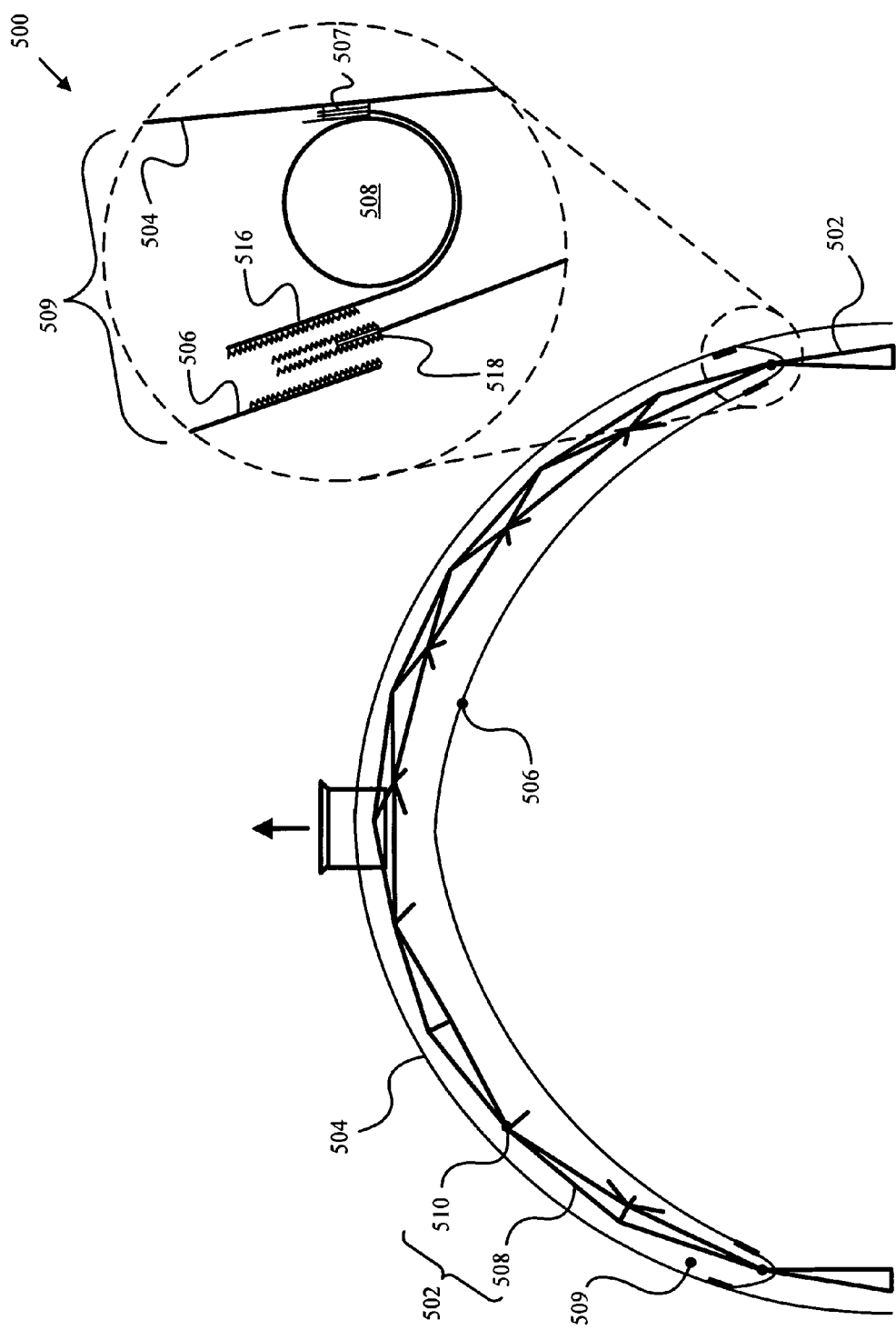
FIG. 5 illustrates bottom flaps for securing the outer first membrane layer to the frame and for coupling the inner second membrane layer to the first membrane layer.

FIG. 5 illustrates a flap 516 for securing the outer first membrane layer 504 to the frame 502 and for coupling the inner second membrane layer 506 to the outer first membrane layer 504. As shown in this figure, the flap 516 is coupled to the first membrane layer 504 by using an attachment means such as by sewing, welding (e.g., vinyl RF welding), and/or seam tape, for example. The flap 516 is wrapped around the beam 508, which in some cases has a diameter of 2.5 inches. On an opposite side of the beam 508, an end of the flap 516 is wrapped around the beam 508 and is secured by a locking means 518 that holds the flap 516 in place against the beam 508. Some embodiments use two sided, two inch Velcro for the locking means 518. Preferably, the locking means 518 is optional such as for applying an additional perimeter of light blocking material and/or an aesthetic curtain below the second membrane 506, and/or adjacent the first membrane 504. In these embodiments, the optional locking means 518 is omitted and instead, the end of the flap 516 and the second membrane layer 506 are attached directly to each other such as, for example, by using a mated pair of Velcro strips.

Once the flap 516, and the outer membrane layer 504 is secured against the beam 508, a portion of the second membrane layer 506 is coupled to the locking means 518, and/or to the flap 516. For instance, the second membrane layer 506 may have a segment thereon of Velcro that is larger than the Velcro on the locking means 518 such as a three inch segment, for example. The Velcro segment is advantageously used to couple the second membrane layer 506 to the flap 516 and/or the first membrane layer 504. The coupling preferably forms a relative air seal such that an air sealed sack, cavity, and/or enclosure 509 is formed between the first and second membrane layers 504 and 506, from which air may be drawn outward and a negative pressure generated therein. Velcro, zippers, sewing, and the like form a relative air seal, while having low cost, light weight, portability, removability and/or reusability.

Figure 6:
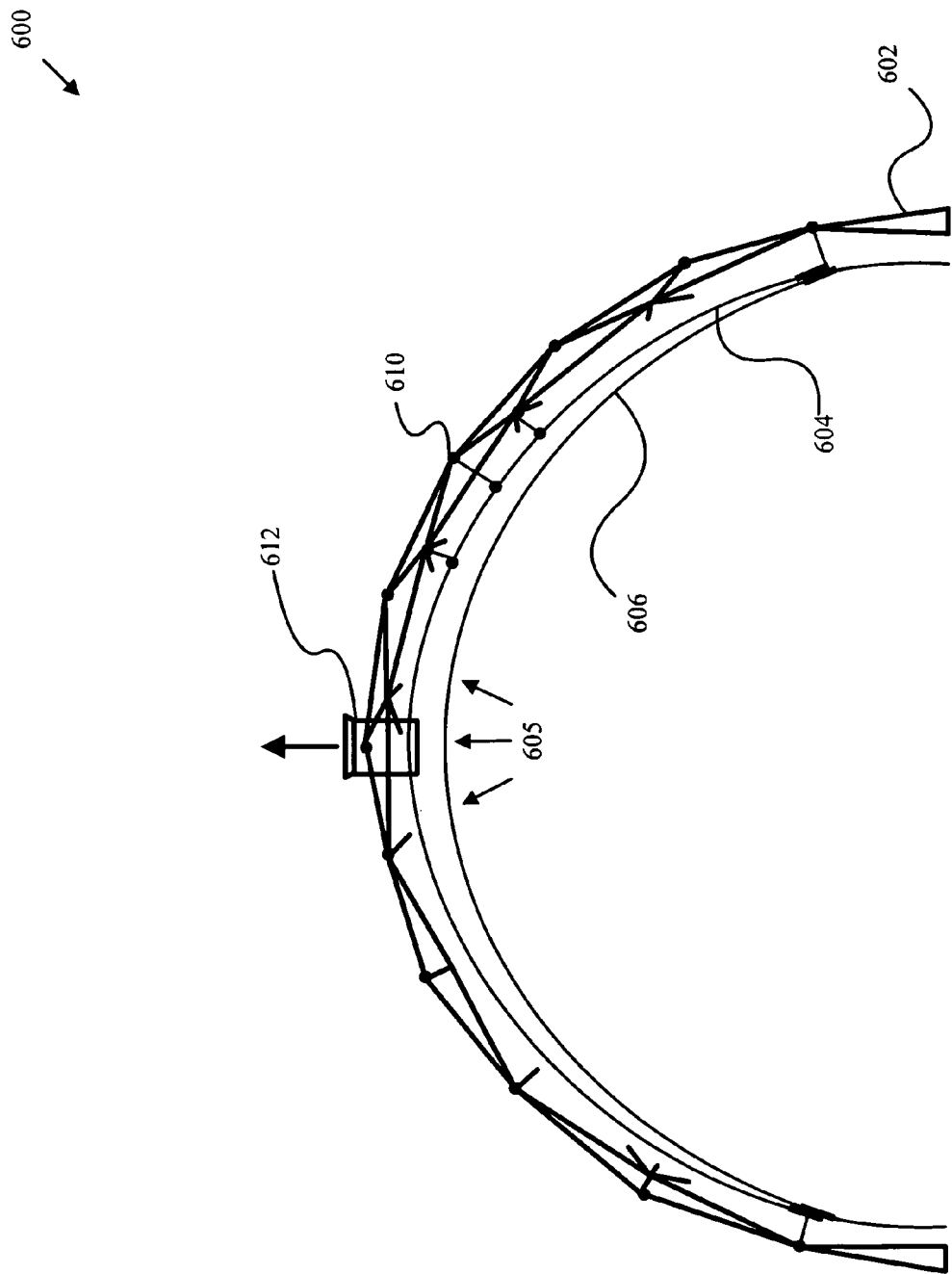
FIG. 6 illustrates a first membrane attached at various points within the interior of the frame structure.

FIG. 6 illustrates a first membrane layer 604 attached at various points within the interior of the frame structure 602. Preferably, a set of straps suspend the first membrane layer 604 a few inches from the frame structure 602 at multiple locations along the frame 602 such as, for example, at each hub 610 of the frame structure 602 (see also FIGS. 7-8). A geodesic type dome structure that is 10-30 meters in diameter can have about 250-500 hubs 610. Hence, these embodiments have approximately 250-500 suspension points and/or straps. This configuration has particular advantages such as the addition of tensile strength from the many straps attached to the first membrane layer 604 pulling inward against many points, vertices, and/or hubs 610 of the geodesic type frame 602. Further, the second membrane layer 606 is coupled to the first membrane layer 604 by using a relative air seal means such as the Velcro, zipper, and/or sewing seal described above. While the first membrane layer 604 is suspended by straps, the second membrane layer 606 is generally suspended by air, thereby advantageously providing a particular projection surface 605. It should be noted that while the second membrane layer is often illustrated in the figures as coupled near the base end(s) of the first membrane layer, one of ordinary skill recognizes that the second membrane and/or projection layer is optionally coupled at any location within the interior of the first membrane layer, and is not required to be coupled at any fixed point or radius within the first membrane layer.

Figure 7:
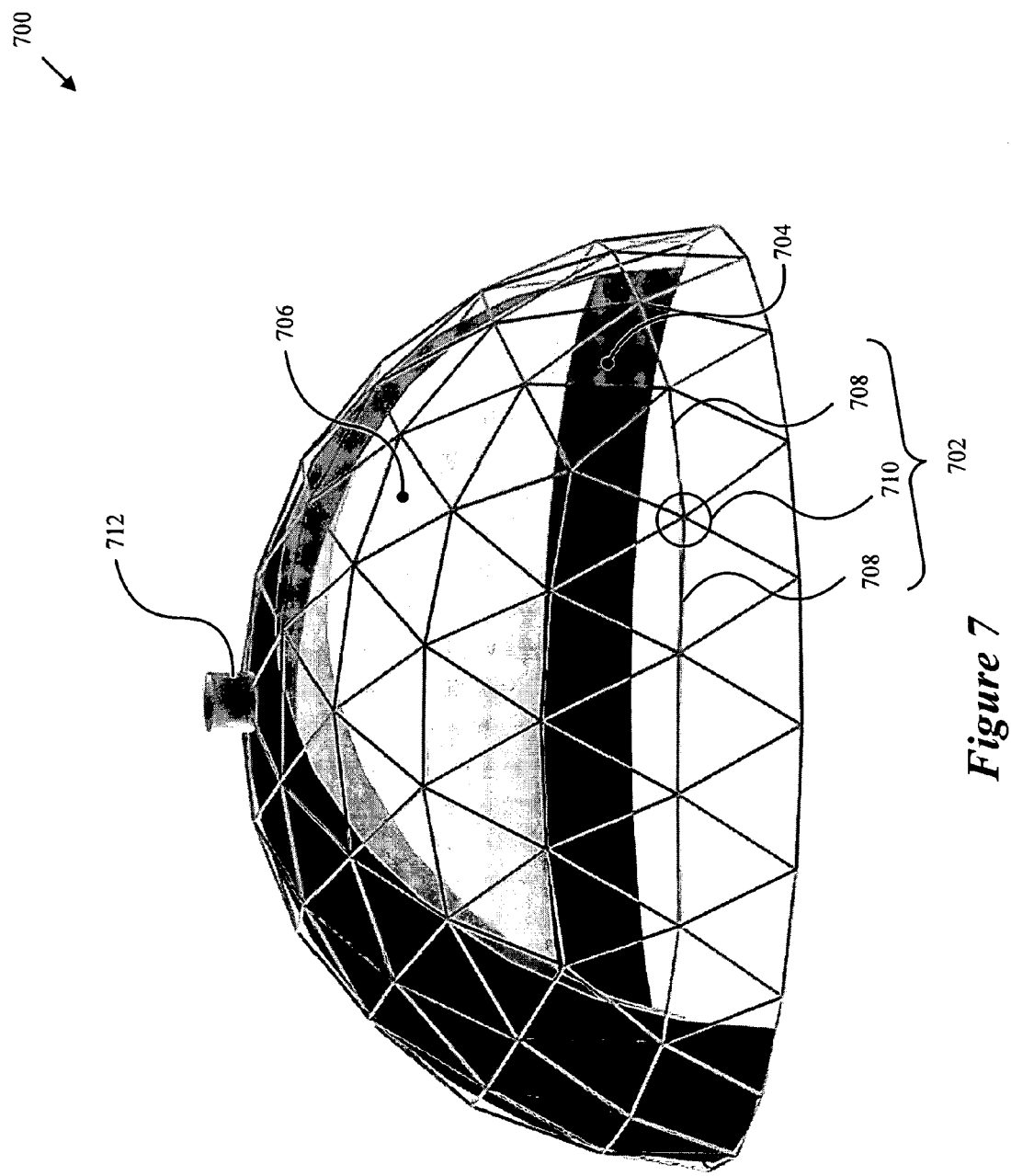
FIG. 7 illustrates a dimensional view of the system of FIG. 6.

FIG. 7 illustrates a dimensional view 700 of the system 600 of FIG. 6. As shown in FIG. 7, the frame 702 is exposed at its exterior, the first and second membrane layers 704 and 706 are enclosed within the frame structure 702, and the second membrane 706 is below the first membrane 704. The first membrane 704 is suspended from the external frame 702 by using straps. The second membrane is suspended by using reverse pressure between the first and second membrane layers 704 and 706. Such a system 700 has certain advantages such as relative portability, quick assembly, and the capability of ingress and/or egress without the need for air locks.

Figure 8:
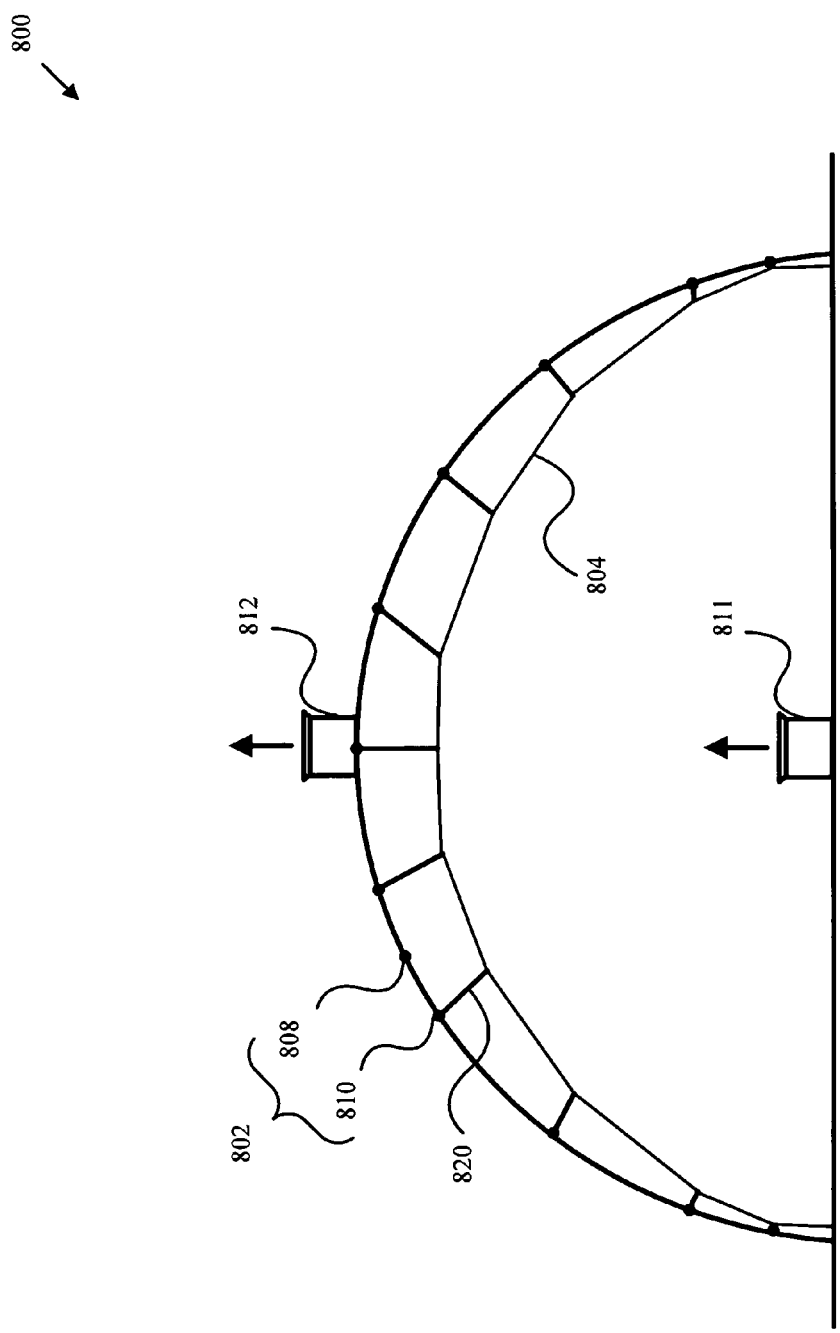
FIG. 8 illustrates internal straps for securing the first membrane layer to the frame structure such that the first membrane layer is suspended on the inside of the frame.

FIG. 8 illustrates internal straps 820 for securing the first membrane layer 804 to the frame structure 802 such that the first membrane layer 804 is suspended on the inside of the frame 802. As mentioned above, the straps 820 are preferably attached near hubs 810 of the frame 802. Advantageously, the internal straps 820 provide additional tensile strength to the structure 802. Also shown in FIG. 8, a forward pressure fan 811 may be used in conjunction with the reverse pressure fan 812 to facilitate the suspension and/or securing of the first membrane layer 804 in place against the frame structure 802. The forward pressure fan 811 is typically positioned within the frame structure 802 such that the direction of air flow blows the first membrane layer 804 toward the structure 802, while the reverse pressure fan 812 may be mounted to the frame 802 to draw air in a direction from the inside toward the outside of the frame structure 802.

Figure 9:
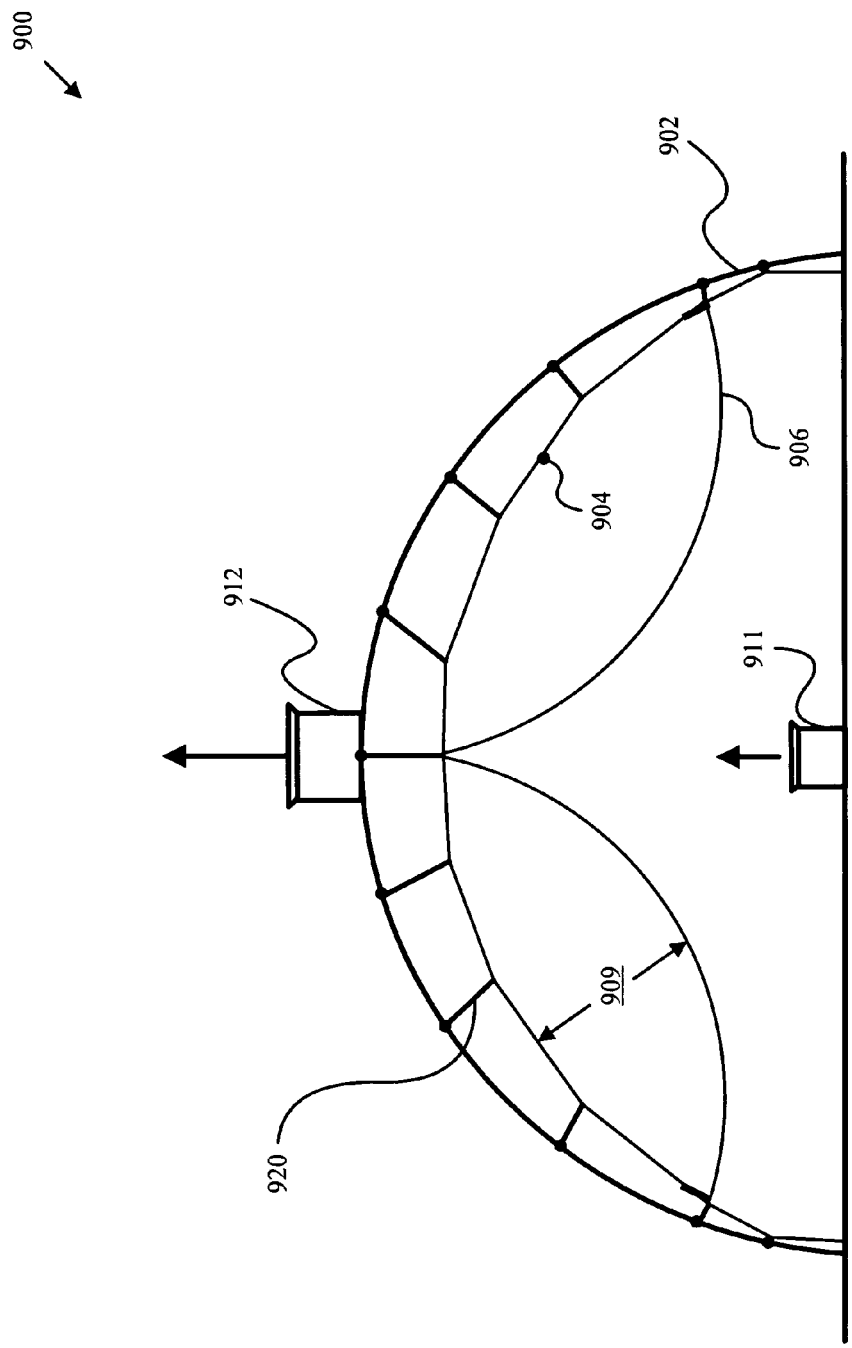
FIG. 9 illustrates a second membrane attached at an upper and a lower portion of the first membrane.

FIG. 9 illustrates a second membrane layer 906 attached at an upper and a lower portion of the first membrane layer 904 after assembly of the frame 902 and attachment of the first membrane layer 904 to the frame 902, but prior to the operation of a reverse pressure fan 912. This manner of assembly has particular advantages. For instance, the second membrane layer 906 is conveniently attached at a point near the top of the first membrane layer 904 by using a crane or similar means. Then, one or more persons conveniently attaches the second membrane layer 906 along its perimeter to various locations of the first membrane layer, in some embodiments, by using the advantageous Velcro and/or zipper mechanism described above. Once a relative air seal is formed between the first and second membrane layers 904 and 906, the operation of the reverse pressure fan 912 is commenced to evacuate air from the space 909 and provide the projection surface, without significant further human effort. Moreover, a forward pressure fan 911 is optionally used in conjunction with the reverse pressure fan 912 to facilitate the positioning and/or lift of the second membrane layer 906.

Figure 10:
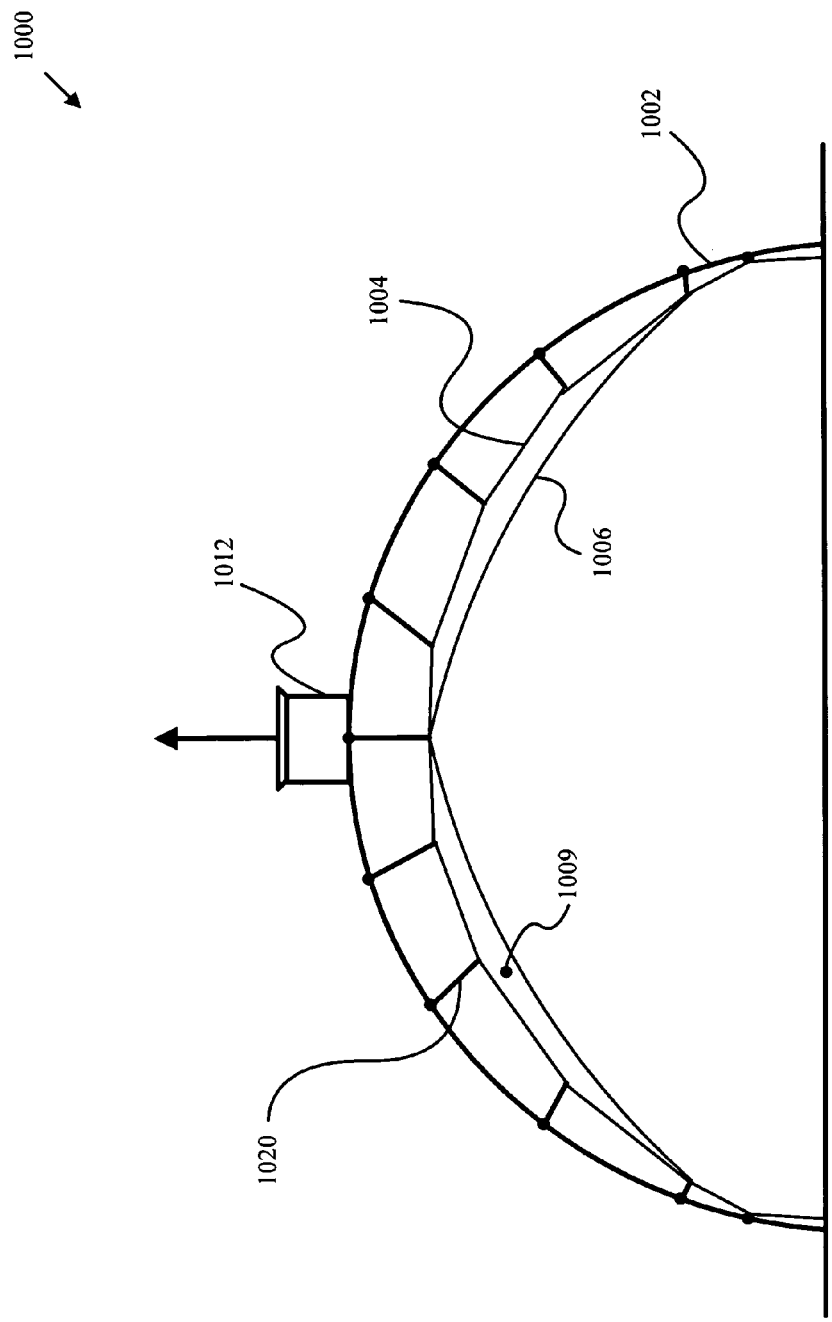
FIG. 10 illustrates the second membrane drawn toward the first membrane.

Accordingly, FIG. 10 illustrates the second membrane layer 1006 drawn toward the first membrane layer 1004 during the operation of the reverse pressure fan 1012. As described above, the reverse pressure fan 1012 causes air flow outward from the cavity 1009 formed between the first and second membrane layers 1004 and 1006, thereby generating a negative pressure within the cavity 1009, which decreases the volume of the cavity 1009. When the first and second membrane layers 1004 and 1006 have been positioned and/or secured in place, any forward pressure fan(s) may be advantageously removed from the structure 1002.

Figure 11:
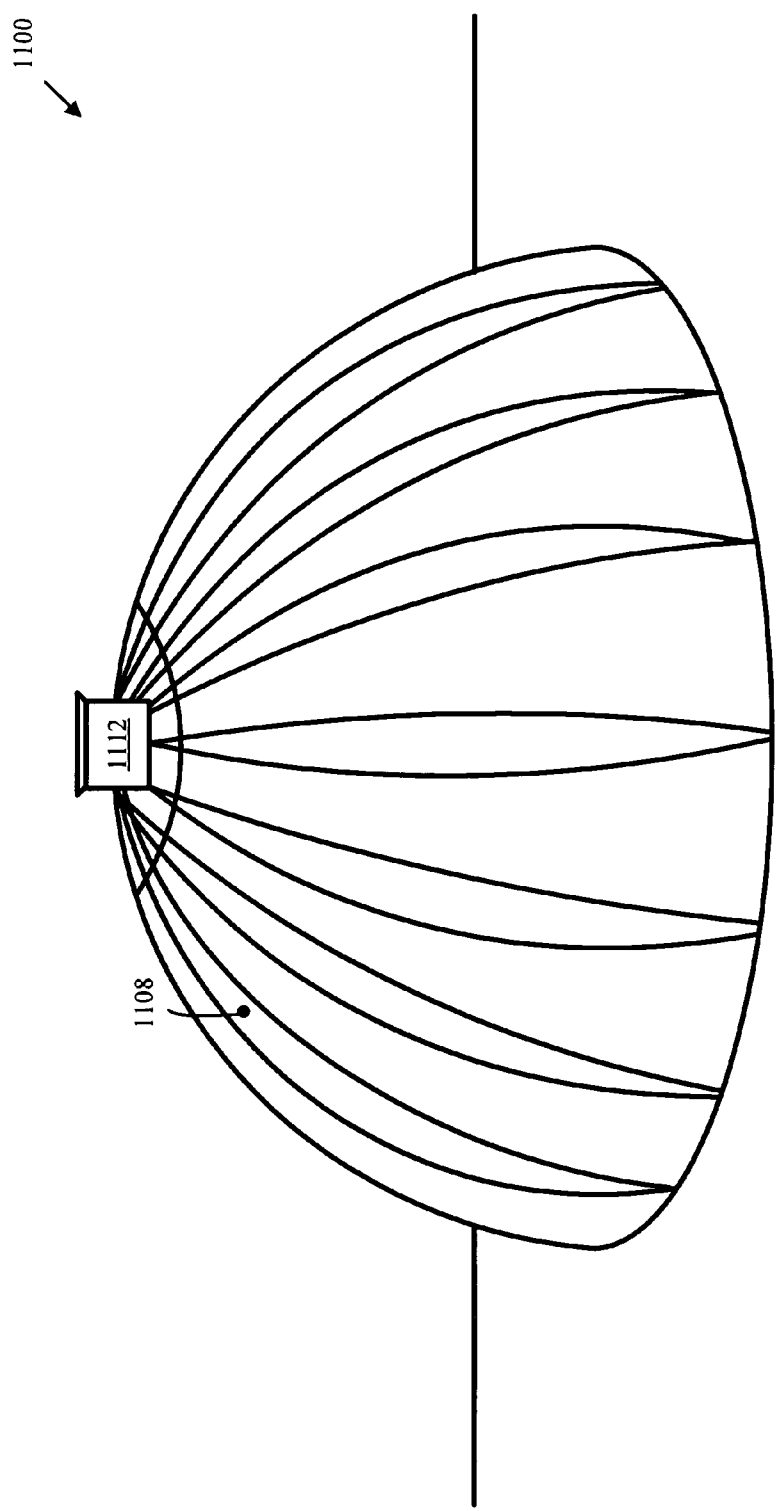
FIG. 11 illustrates a frame structure comprising inflatable beams.

Embodiments of the invention are not limited to geodesic type dome structures. The following describes additional exemplary shapes and structures in accordance with additional embodiments of the invention. Further embodiments are understood by one of ordinary skill. In view of the foregoing, FIG. 11 illustrates a frame structure 1102 comprising inflatable beams 1108. The beams 1108 may involve tubing that is deflated for storage and/or transport, and filled with air or another fluid to inflate into a particular frame structure 1102, which in this case is a dome. This implementation has advantages regarding low weight and ease of assembly, but may have limitations regarding strength, wind resistance, and/or maximum size for the frame 1102. Further, with larger size frames, the inflation time and inflation pressure required undesirably increases. Then, a first membrane layer is advantageously coupled to the exterior or the interior of the frame structure 1102, as described above. Also, a second membrane layer is coupled to the first membrane layer, and a negative pressure is advantageously generated between the first and second membrane layers.

Figure 12:
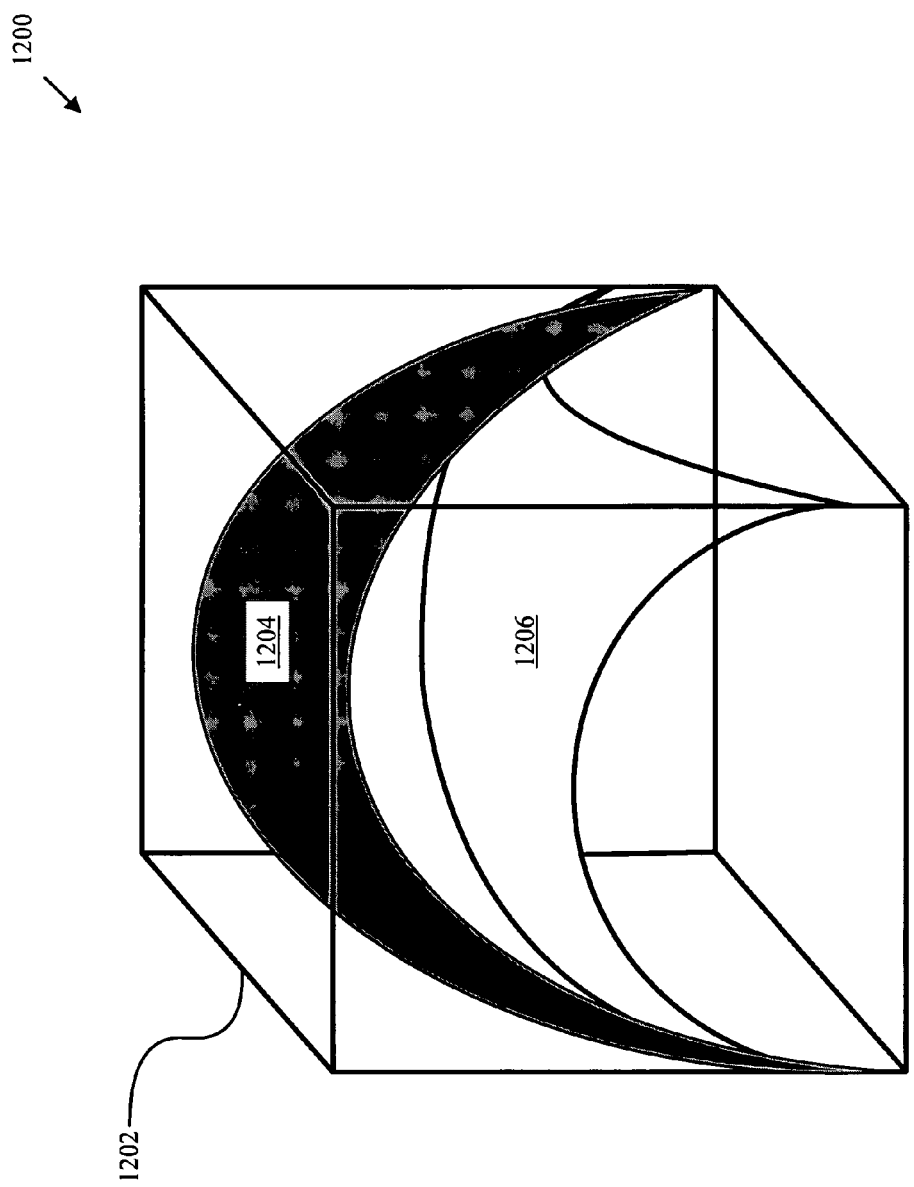
FIG. 12 illustrates a cube type frame structure.

FIG. 12 illustrates a cube type frame structure 1202. Preferably, the cube 1202 comprises a number of materials that are selected for specific performance characteristics as described herein. Then, a first membrane layer 1204 is suspended by using a securing means within or external to the cube. A second membrane layer 1206 is coupled to the first membrane layer 1204 to advantageously form a relative air seal. An air flow means is used to remove air from between the first and second membrane layers 1204 and 1206, and generates a negative pressure therein. The negative pressure draws the second membrane layer 1206 into a particular configuration, which preferably presents a quality projection surface.

Figure 13:
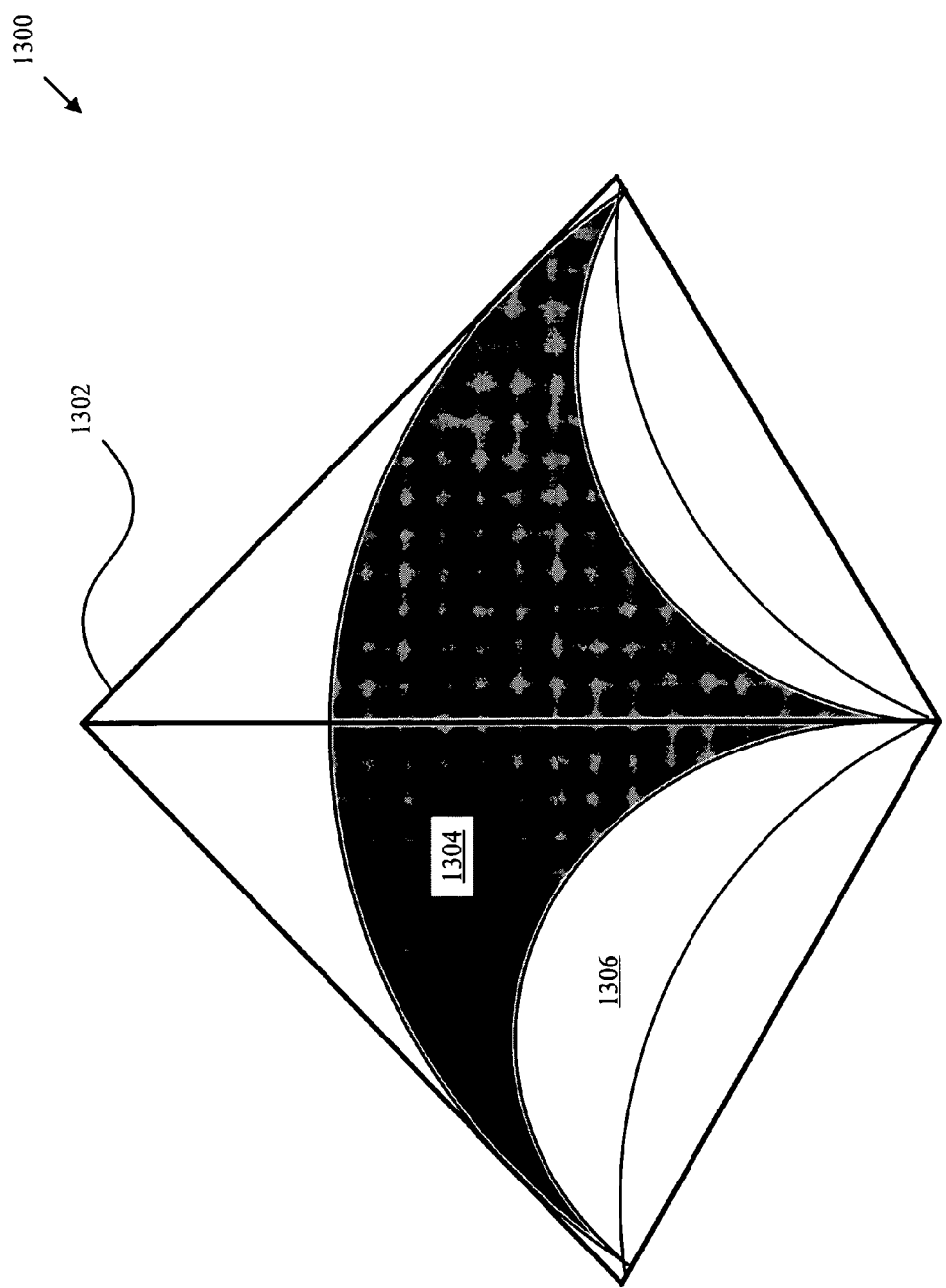
FIG. 13 illustrates a pyramid type frame structure.

FIG. 13 illustrates a pyramid type frame structure 1302. Advantageously, a first membrane layer 1304 is suspended within the pyramid structure 1302 by an attachment means. A second membrane layer 1306 having a suitable projection surface is preferably suspended within the pyramid structure 1302 by using a generated negative pressure between the first and second membrane layers 1304 and 1306.

Figure 14:
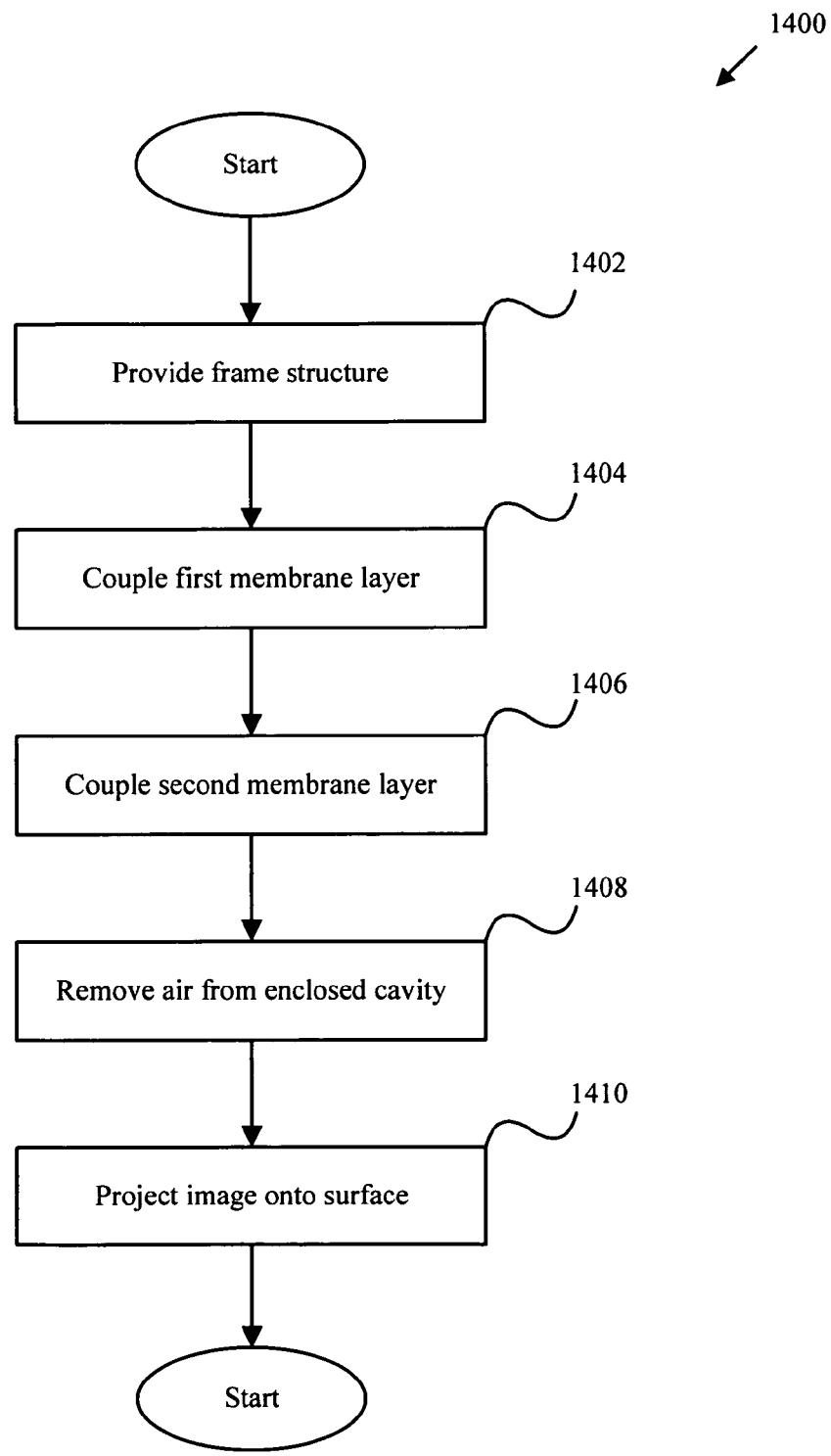
FIG. 14 illustrates a process according to some embodiments of the invention.

FIG. 14 illustrates an assembly process 1400 for a projection system according to some embodiments of the invention. As shown in this figure, the process 1400 begins at the step 1402, where a frame structure is provided. Some embodiments provide a dome type structure, however, other structures are contemplated including for example, cube type and/or other shaped structures. Further, some embodiments use a steel or aluminum, and/or air or fluid filled tubes or pipes for the frame structure. As described above, each structural shape, type of dome, and type of material has particular advantages that are available for different applications of the projection system. For instance, an air and/or fluid filled tube frame structure may be undesirable in high winds or other weather conditions, while metal type frames may have larger maximum diameters and may withstand more extreme weather conditions. The assembly time for a metal frame type structure having a diameter of 10, 20, 30 or 40 meters can be approximately eight to twelve hours. Further at the step 1402, some embodiments anchor and/or weight the frame structure by using stakes, anchors, and/or weights near the base of the frame structure. Advantageously, some implementations withstand winds on the order of 100 miles per hour. After the step 1402, the process transitions to the step 1404.

At the step 1404, a first membrane layer is coupled to the frame structure. The first membrane layer is coupled either to the exterior or the interior of the frame structure. When coupled to the exterior of the frame structure, the first membrane layer is preferably coupled by using folds or flaps at a plurality of locations near a perimeter and/or circumference of the first membrane layer. When coupled to the interior of the frame structure, the first membrane layer is coupled by using straps at several points near a perimeter and at other points such as near the center of the first membrane layer.

The first membrane layer preferably includes a variety of advantageous properties. For instance, the material of the first membrane layer preferably provides some light blocking to prevent undesirable light from passing through the first membrane layer. Further, the material of the first membrane layer is preferably selected for a combination of light weight, strength, durability, fire/water/wind resistance, and low stretch. A light weight vinyl or polyester fabric such as described above is an example of such a material.

At the step 1406, a second membrane layer is coupled to the first membrane layer. The second membrane layer is advantageously coupled at perimeter of the second membrane layer to a perimeter, circumference, portion, and/or radius of the first membrane layer. The first membrane layer is often slightly larger in diameter than the second membrane layer. Preferably, the coupling is by using Velcro, a zipper, sewing, and/or another type of coupling that provides some degree of air seal between the first membrane layer and the second membrane layer. Some implementations further initially couple a point near the center of the second membrane to a point near the apex or the top of the frame structure by using a crane, for example, such that humans may enter the structure beneath the second membrane layer. Then, the seal is formed around the perimeter/circumference of the second membrane layer.

The second membrane layer preferably includes a shape and/or a surface that is suitable as a projection screen. Advantageously, for instance, the second membrane layer of some embodiments has a circular, semi circular, spherical, and/or hemi spherical shape, and moreover includes a smooth, high contrast surface color such as a gray scale projection screen, for example. The material of the second membrane may be selected for additional advantageous properties such as light weight, low distortion/stretch, and/or fire resistance, for example. Vinyl found in outdoor tents or polyester of a type used in making fabric architecture, or sails for sailboats, are examples of such a material of the second membrane layer.

Once, the second membrane layer is coupled at the step 1406, the process 1400 transitions to the step 1408, where air is removed from the cavity that is enclosed by the first membrane layer and the second membrane layer. Preferably, the air is removed by using a reverse pressure air flow from the inside to the outside of the cavity formed by the first and second membrane layers. To provide the reverse pressure, some embodiments couple a fan to the frame structure to draw air outward from between the first membrane layer and the second membrane layer. The fan may be situated near the top of the frame structure, or at other locations such as near the sides. If the fan is situated near a side of the frame structure, however, an air tube is preferably placed near the top of the frame structure to provide greater efficiency of the air flow through the fan, and maximize the reverse pressure within the air space of the cavity.

Regardless of the fan placement, the reverse pressure caused by the outward air flow generates a reduced air pressure between the first and second membranes. Since the first membrane is secured and/or fixed to the frame structure, only the second membrane layer can move toward the first membrane layer. Hence, the second membrane layer is drawn toward the first membrane layer and is eventually held in place to form a particular shape that is defined by the second membrane layer, the first membrane layer, and the reverse pressure that is provided between the first and second membrane layers. Once assembled, embodiments of the invention allow viewers to enter and/or exit the projection system naturally, and without the use of air locks.

At the step 1410, an image is projected onto a surface of the second membrane layer. The projection is performed by one or more projectors arranged at various locations within the interior of the frame structure. For instance, some embodiments place projector(s) near the center of the base of the frame structure, and/or at an edge of the base of the frame structure. Moreover, some embodiments place projector(s) several feet above the base of the frame structure to prevent undesirable interactions of viewers with the projectors such as, for example, touching by viewers, occlusion of the projected image by viewers heads, shining of bright projection lights into the audience, and/or unsightly visibility of projection equipment. After the step 1410, the process 1400 concludes. Advantageously, the portable system is disassembled for mobility by reversing the steps of the process 1400.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method of projection comprising:
   providing a frame structure comprising a base and a top;
   coupling a first membrane layer to the frame structure;
      coupling the first membrane layer to an interior surface of the frame structure at a plurality of points near the perimeter of the first membrane layer and near the top of the frame structure;
   coupling a second membrane layer to the first membrane layer, thereby forming a cavity enclosed by the first membrane layer and the second membrane layer;
   blowing air against the first membrane layer by using a fan positioned near the base of the frame structure to facilitate the coupling of the first membrane layer to the interior surface of the frame structure;
   removing air from the enclosed cavity such that the second membrane layer is drawn toward the frame structure; and
   projecting an image onto a surface of the second membrane layer.

2. The method of claim 1, further comprising providing a reverse pressure to remove air from the enclosed chamber, the reverse pressure provided by a fan that is positioned at one or more points along the frame structure.

3. The method of claim 1, wherein the projecting originates from a position that is several feet above the base of the frame.

4. The method of claim 1, wherein the frame structure comprises one of steel, aluminum, and air filled tubing.

5. The method of claim 1, wherein the frame structure comprises one or more of a geodesic dome, a metal dome, an inflatable dome, a pyramid, and a cube.

6. The method of claim 1, wherein the second membrane layer is selected for one of:
   extending to the base of the frame structure, and
   not extending to the base of the frame structure.

7. The method of claim 1, further comprising anchoring the base of the frame structure to a fixed position such that the first and second membranes are resistant to motion caused by wind.

8. A projection system comprising:
   a frame structure having a base and a top;
   a first membrane layer coupled to the frame structure;
      the first membrane layer coupled to an interior surface of the frame structure at a plurality of points near the perimeter of the first membrane layer and near the top of the frame structure;
   a fan for blowing air against the first membrane layer to facilitate the coupling of the first membrane layer to the interior surface of the frame structure, the fan positioned near the base of the frame structure;
   a second membrane layer coupled to the first membrane layer such that an enclosure is formed between the first membrane layer and the second membrane layer; and
   an air flow device for removing air from the enclosure formed by the first membrane layer and the second membrane layer.

9. The system of claim 8, further comprising a fan for providing a reverse pressure to remove air from the enclosure formed by the first and second membranes, the fan positioned at one or more points along the frame structure.

10. The system of claim 8, further comprising a projector at a position that is several feet above the base of the frame structure.

11. The system of claim 8, wherein the frame structure comprises one of steel, aluminum, and air filled tubing.

12. The system of claim 8, wherein the frame structure comprises one or more of a geodesic dome, a metal dome, an inflatable dome, a pyramid, and a cube.

13. The system of claim 8, wherein the second membrane layer is configured for one of:
   extending to the base of the frame structure, and
   not extending to the base of the frame structure.

14. The system of claim 8, further comprising an anchor at the base of the frame structure to a fixed position such that the first and second membranes are resistant to motion caused by wind, the anchor comprising one or more of a weight and a stake.

15. The system of claim 8, the first membrane comprising a material that is selected for one or more of weight, strength, stretch, fire resistance, and light blocking properties.

16. The system of claim 8, the first membrane comprising at least one of a vinyl, a polyester, and a nylon.

17. The system of claim 8, the second membrane comprising a projection surface that is selected for one or more of weight, strength, stretch, fire resistance, distortion, and optical quality.

18. The system of claim 8, the second membrane comprising at least one of a vinyl, a polyester, and a nylon.

19. A method of projection comprising:
   providing a frame structure comprising a base and a top;
   coupling a first membrane layer to the frame structure;
   coupling a second membrane layer to the first membrane layer, thereby forming a cavity enclosed by the first membrane layer and the second membrane layer;
   removing air from the enclosed cavity between the frame structure and the first membrane layer to facilitate the suspension and securing of the first membrane layer in place against the frame structure;
   blowing air against the second membrane layer by using a fan positioned near the base of the frame structure to facilitate the positioning and lift of the second membrane layer; and
   projecting an image onto a surface of the second membrane layer.

* * * * *